US005671170A

United States Patent [19]
Markstein et al.

[11] Patent Number: 5,671,170
[45] Date of Patent: Sep. 23, 1997

[54] METHOD AND APPARATUS FOR CORRECTLY ROUNDING RESULTS OF DIVISION AND SQUARE ROOT COMPUTATIONS

[75] Inventors: Peter Markstein, Woodside; Alan H. Karp, Palo Alto, both of Calif.

[73] Assignee: Hewlett-Packard Company, Palo Alto, Calif.

[21] Appl. No.: 270,203

[22] Filed: Jul. 1, 1994

Related U.S. Application Data

[63] Continuation-in-part of Ser. No. 058,164, May 5, 1993, Pat. No. 5,341,321.

[51] Int. Cl.⁶ .................................................. G06F 7/38
[52] U.S. Cl. .................................................. 364/748
[58] Field of Search ........................ 364/748, 752, 364/761, 736, 745

[56] References Cited

U.S. PATENT DOCUMENTS

| | | | |
|---|---|---|---|
| 4,562,553 | 12/1985 | Mattedi et al. | 364/745 |
| 4,999,801 | 3/1991 | Katsuno | 364/748 |
| 4,999,802 | 3/1991 | Cocanougher et al. | 364/748 |
| 5,042,001 | 8/1991 | Brightman et al. | 364/736 |
| 5,157,624 | 10/1992 | Hesson | 364/748 |
| 5,220,524 | 6/1993 | Hesson | 364/748 |

OTHER PUBLICATIONS

P.W. Markstein, "Computation of Elementary Functions on the IBM RISC System/6000 Processor", IBM Journal of Research and Development, vol. 34, No. 1, Jan. 1990.

*Primary Examiner*—Tan V. Mai

[57] ABSTRACT

A floating point arithmetic unit for correctly rounding a quotient or a square root of high precision numbers to the floating point number closest to the exact result is disclosed. The invention is generally applicable to round results to a precision greater than that provided by the floating point hardware. Prior to rounding, the hardware within the floating point unit produces a high precision mantissa with all but the last few digits correct. The rounding technique according to the invention is then used to produce a correctly rounded result using an enhanced Tuckerman test. Unlike a conventional Tuckerman test, the enhanced Tuckerman test determines the last few ULPs for both square root and division while checking for early termination. The advantage of checking for early termination is that the computation time needed to make the rounding decision can be significantly reduced.

18 Claims, 8 Drawing Sheets

METHOD AND APPARATUS FOR CORRECTLY ROUNDING RESULTS OF DIVISION AND SQUARE ROOT COMPUTATIONS

CROSS REFERENCE TO RELATED APPLICATION

This application is a continuation-in-part of pending U.S. patent application Ser. No. 08/058,164, filed May 5, 1993 entitled "FLOATING POINT ARITHMETIC UNIT USING MODIFIED NEWTON-RAPHSON TECHNIQUE FOR DIVISION AND SQUARE ROOT", U.S. Pat. No. 5,341,321.

BACKGROUND OF THE INVENTION

1. Field of the Invention

The present invention relates to a data processing system having a floating point arithmetic unit and, more particularly, to a method and apparatus for performing high accuracy rounding.

2. Description of the Related Art

Floating point units conventionally use hardware or software to perform division and square root operations. The hardware approaches include either use of dedicated division and square root circuitry or use of microcode in conjunction with addition and multiplication circuitry. The microcode operates to carry out an iterative procedure. Examples of such iterative procedures are nonrestoring series expansion and Newton-Raphson. The software approach uses program instructions to carry out iterative procedures.

Regardless of the approach used, the floating point unit can produce a nearly approximate result, that is, a result having an error only in the last few bits. The problem with the conventional approaches is that when such floating point units are requested to perform division or square root of a high precision number (e.g., quad precision) to a floating point number closest to the exact result, an inordinate amount of time is required to obtain correct values for only the last few bits. For example, in a typical previously existing workstation product, the nearly approximate result can be obtained in about 13 cycles, but to obtain the closest exact result it takes about 134 cycles.

Due to the inordinate amount of time needed to obtain the correct values for the last few bits, some computer manufacturers do not even attempt to obtain the correct values for the last few bits. Although the accuracy that can be conventionally provided in a reasonable mount of time is accurate to a few Units in the Last Place (ULPs) which is sufficient for many applications, certain applications require more accuracy. Namely, some applications require that the result produced be accurate to half an ULP or less.

The problem is that known approaches cannot efficiently determine the last few bits of accuracy. Conventionally, with every additional bit of accuracy sought, more processing time is required. In particular, although additional iterations may be used to obtain the additional precision, these iterations to determine the last few bits are very costly in terms of processing time.

Another problem associated with the known approaches is their difficultly in achieving monotonicity. Also, since most conventional approaches cannot provide results having an accuracy of half an ULP or less, intrinsic library functions are not easily upgraded because differing results will likely be produced. When monotonicity or high accuracy (e.g., to half an ULP) is needed and not provided by the floating point arithmetic unit, differing results may be produced, thereby confusing users when the same or expected value is not returned.

Thus, there remains a need for a rounding technique which efficiently and consistently produces high precision results that are correctly rounded.

SUMMARY OF THE INVENTION

The invention enables a floating point arithmetic unit to compute a quotient or a square root of high precision numbers, where the quotient or square root is correctly rounded to the floating point number closest to the exact result. The invention is generally applicable to round results to a precision greater than that provided by the hardware.

Prior to rounding, the hardware within the floating point arithmetic unit produces a high precision mantissa with all but the last few digits correct. The rounding technique according to the invention is then used to produce a correctly rounded result. The invention makes use of an enhanced Tuckerman test to obtain correct values for the last few ULPs for both square root and division while choking for early termination. The advantage of checking for early termination is that the average computation time needed to make the rounding decision is significantly reduced.

An embodiment of the floating point arithmetic unit according to the invention performs at least one of a division operation to divide a dividend by a divisor to produce a correctly rounded quotient and a square root operation of a value to produce a correctly rounded square root. The arithmetic unit includes: a multi-ported storage device for storing data; arithmetic means for multiplying two numbers to produce a product and for adding two numbers to produce a sum; approximation means for providing an approximated result for at least one of the divide and square root operations; rounding microcode containing procedures for correctly rounding the approximated result of at least one of the divide and square root operations using an enhanced Tuckerman test; and a control unit for controlling the floating point arithmetic unit. The rounding microcode operates to correctly round the approximated result to produce a correctly rounded result by first insuring that the approximated result is underestimated, and then by enabling early termination of the Tuckerman test based on intermediate results of the Tuckerman test.

The invention can also be implemented as a method. The method operates to correctly round a high precision approximated result of a division or square root operation using the enhanced Tuckerman test. The method is performed in a data processing system and begins by obtaining an approximate result for the division or square root operation. Most of the bits of the approximate result are guaranteed to be correct. Next, the method insures that the approximate result is an underestimate of the actual result. Thereafter, the method correctly rounds the approximate result to produce a correctly rounded result by performing the enhanced Tuckerman test to determine how to round the approximate result. The enhanced Tuckerman test is advantageous because when it terminates early based on a sign and/or magnitude of intermediate results of the Tuckerman test, the correctly round result is obtained more quickly than heretofore obtainable.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention is intended for use in a floating point arithmetic unit. By using the invention, a floating point arithmetic unit is able to produce results with a precision which is at least twice that offered by the hardware. Preferably, the invention correctly rounds a 2N-bit approximation where the hardware is capable of directly operating on only an N-bit precision number. For example, if the hardware is able to provide double precision results in hardware, the invention will provide correctly rounded quad precision results.

The invention is equally applicable to multiprecision numbers. Multiprecision numbers are numbers having a precision greater than quad precision. These numbers may be stored in a single precision floating point array. In one implementation, the first word in the array is an integer valued floating point number whose absolute value represents the number of words in the mantissa. The sign of the first word is the sign of the multiprecision number. The next word is an integer valued floating point number representing the exponent of the number base. The decimal point follows the first mantissa word. Known software library routines are available to carry out mathematical operations on these numbers. See e.g., Bailey, *A Portable High Performance Multiprecision Package*, RNR Technical Report RNR-90-022, NAS Applied Research Branch, NASA Ames Research Center, Moffett Field, Calif., May 1992.

Embodiments of the invention are discussed below with reference to FIGS. 1–8. However, those skilled in the art will readily appreciate that the detailed description given herein with respect to these figures is for explanatory purposes as the invention extends beyond these limited embodiments.

Figure 1:
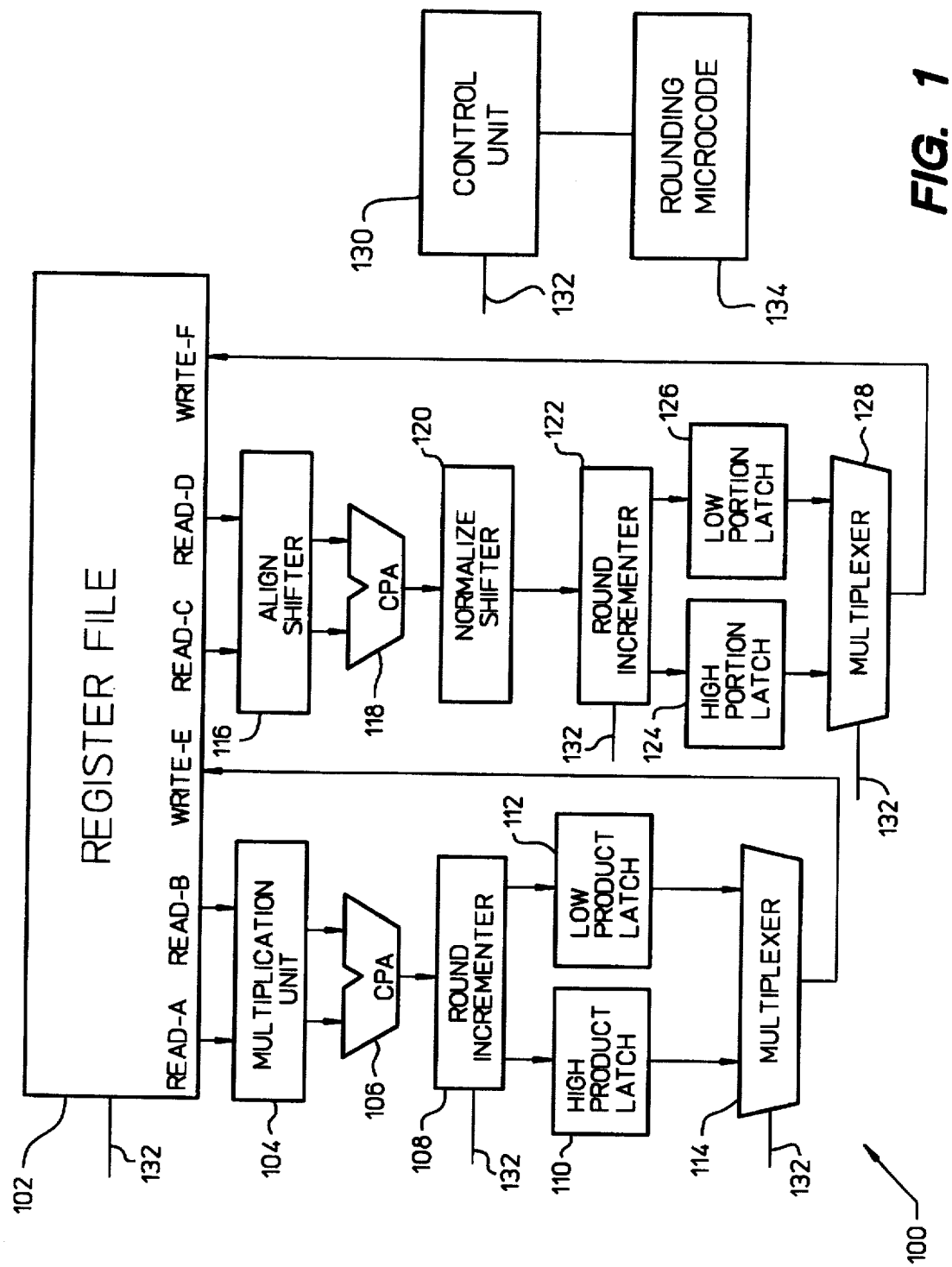
FIG. 1 is a block diagram of a floating point arithmetic unit according to a first embodiment of the invention.

FIG. 1 illustrates a first embodiment of a floating point arithmetic unit 100. This embodiment stores quad precision numbers in a double-double format. The arithmetic unit 100 includes separate circuitry for multiplication and addition.

A multi-port register file 102 includes read ports A, B, C and D, and write ports E and F. The register file 102 stores data having a N-bit word size. A multiplication unit 104 is coupled to read ports A and B to respectively receive a multiplicand and a multiplier. The multiplication unit 104 provides a high partial product and a low partial product to a carry propagate adder (CPA) 106. The CPA 106 adds the high and low partial products. The sum produced by the CPA 106 is then rounded to 2N-bits by a round incrementer 108. Although the round incrementer 108 may be a preferred, such intermediate rounding is not necessary for the invention.

The rounded result consists of two N-bit portions which are respectively held in a high product latch 110 and a low product latch 112. A multiplexer 114 receives the latched N-bit portions from the latches 110, 112. The output of the multiplexer 114 is connected to write port E of the register file 102 so that the two N-bit portions of the multiplication operations can be stored in the register file 102 in two write operations, one for the high portion and one for the low portion.

Accordingly, read ports A and B provide the multiplicand and the multiplier to the multiplication unit 104. The results of the multiplication consist of two N-bit values which are rounded and forwarded to the write port E of the register file 102 for temporary storage.

Other ports of the register file 102 are associated with the addition circuitry of the floating point arithmetic unit 100. An align shifter 116 receives the addends from read ports C and D of the register file 102 and aligns them for addition. A carry propagate adder (CPA) 118 then adds the aligned values and supplies a sum to a normalize shifter 120. The normalized sum is then rounded to 2N-bits by a round incrementer 122 to produce a rounded sum. Again, the round incrementer 122 is not strictly necessary. The first N-bits of the rounded sum are latched in a high portion latch 124, and the second N-bits of the rounded sum are latched in a low portion latch 126. A multiplexer 128 receives the latched sums from latches 124, 126 as inputs and forwards the latched sums back to write port F in two passes.

A control unit 130 receives instructions to be executed and provides the necessary control signals 132 to the various circuits as illustrated in FIG. 1. Hence, the control unit 130 controls the multiplication and addition circuitry to carry out the instructions.

In order to adapt the floating point arithmetic unit 100 so as to properly perform the high accuracy rounding, rounding microcode 134 is provided and made accessible to the control unit 130. The procedures contained within the rounding microcode 134 are discussed in detail below.

The rounding microcode 134 operates to correctly round approximate results to a precision greater that the precision offered by the hardware. The approximate results to be rounded can be produced in any number of ways, provided the approximated results can be guaranteed to be correct to a certain number of bits.

One way to produce the results to be rounded in described in U.S. patent application Ser. No. 08/058,164, entitled "FLOATING POINT ARITHMETIC UNIT USING MODIFIED NEWTON-RAPHSON TECHNIQUE FOR DIVISION AND SQUARE ROOT", which is hereby incorporated by reference. Using such an approach, the control unit 130 of the floating point arithmetic unit 100 would execute high precision divide and square root instructions using divide and square root microcode (not shown). The divide and square root microcode uses iterative procedures. Since the iterative procedures begin with an initial guess of a reciprocal or a reciprocal square root, reciprocal and reciprocal square root initial guess tables (not shown) would also be accessible to the floating point arithmetic circuit 100. These initial guess values are supplied to the register file 102 so that they can be used in either the multiplication circuitry or the addition circuitry.

Figure 2:
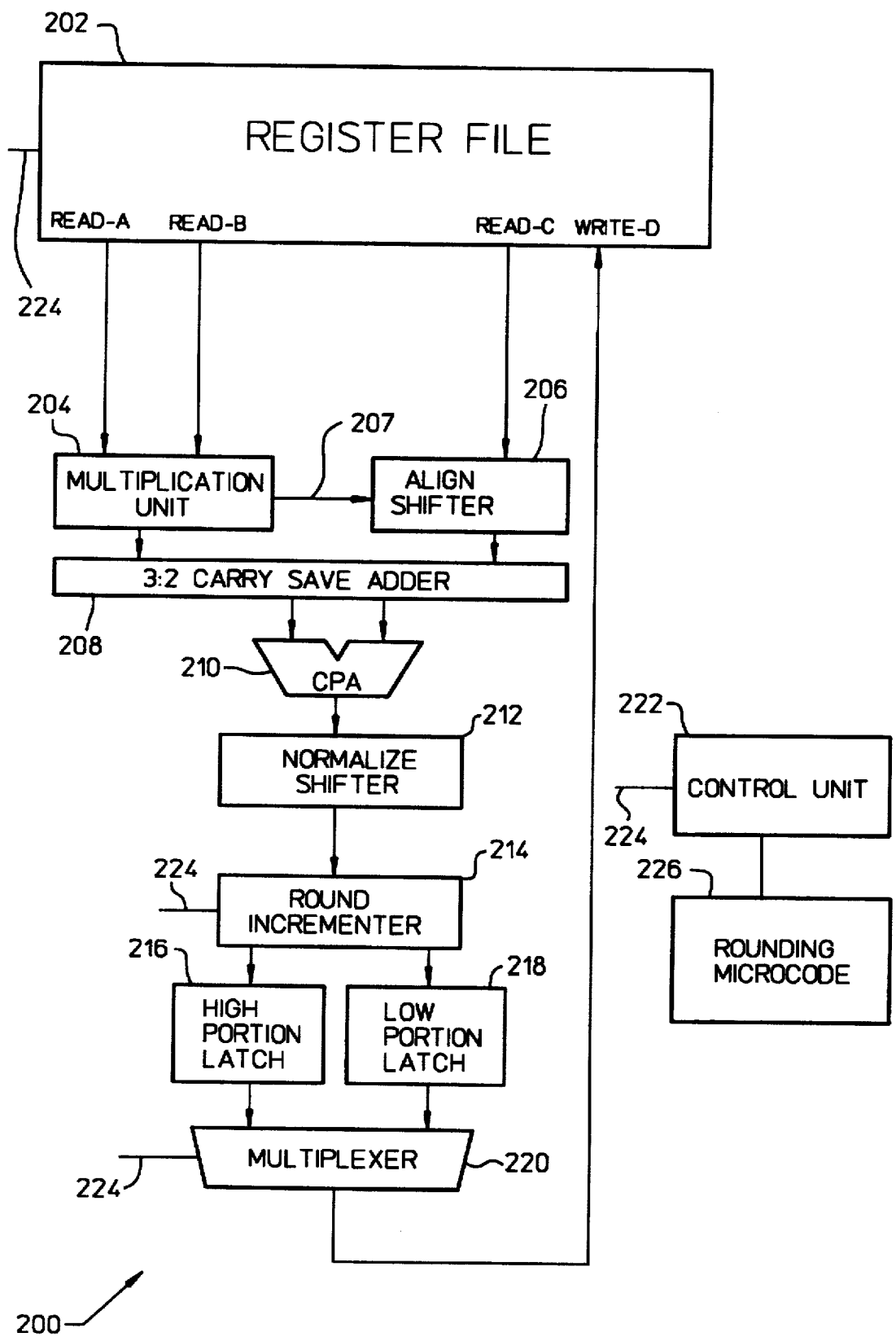
FIG. 2 is a block diagram of a floating point arithmetic unit in accordance with a second embodiment of the invention.

FIG. 2 is a block diagram of a floating point arithmetic unit 200 according to a second embodiment of the invention.

The floating point arithmetic unit 200 illustrated in FIG. 2 is a multiply-add-fused (MAF) design. That is, a multiplication unit and an adder are fused together so that multiplication and addition may occur as one atomic operation.

A multi-port register file 202 includes read ports A, B and C, and write port D. A multiplication unit 204 receives a multiplicand and a multiplier from read ports A and B and produces a product. An align shifter 206 receives an addend from read port C and aligns the addend in accordance with the exponent of the product using a signal 207 from the multiplication unit 204.

A 3:2 carry save adder 208 receives inputs from the multiplication unit 204 and the align shifter 206 and provides at least 2N-bits of output to a carry propagate adder (CPA) 210. The leading 2N-bits from the carry save adder 208 are needed. The CPA 210 produces a 2N-bit result which is then normalized by a normalize shifter 212 and rounded to a 2N-bit result by a round incrementer 214 (again, not strictly necessary). The rounded result is then supplied in two N-bit portions to a high portion latch 216 and a low portion latch 218, respectively. A multiplexer 220 receives the latched N-bit portions from the latches 216, 218. The output of the multiplexer 220 is connected to write port D of the register file 202 so that the two N-bit portions can be stored in the register file 202 in two write operations, one for the high portion and one for the low portion.

A control unit 222 controls the circuitry of the floating point arithmetic unit 200 using various control signals 224. Specifically, to perform rounding the control unit 222 uses rounding microcode 226. The approximated result to be rounded can be produced by the floating point arithmetic unit 200 and then held in the register file 202 until rounded.

The control unit 222 also carries out arithmetic instructions. When the instruction received at the control unit 222 is either a divide instruction or a square root instruction, the control unit 222 accesses divide and square root microcode (not shown) so as to execute the iterative procedures required to perform division and square root operations using multiplication and addition circuitry. In this manner, the floating point arithmetic unit 200 is able to produce an approximate result to be rounded.

For performance reasons, the first and second embodiments (FIGS. 1 and 2) may be further enhanced using well known circuitry. For example, to facilitate pipelining additional latches may be added between the register file and the multiplication unit or the align shifter. Multiplexers could also be inserted between the register file 102 and the multiplication unit 104 and the align shifter so as to more quickly feed the multiplication unit or align shifter with inputs. Nevertheless, these and numerous other well known enhancements are not part of the invention but are primarily design choices for the hardware and for that reason are not discussed further herein.

Figure 3:
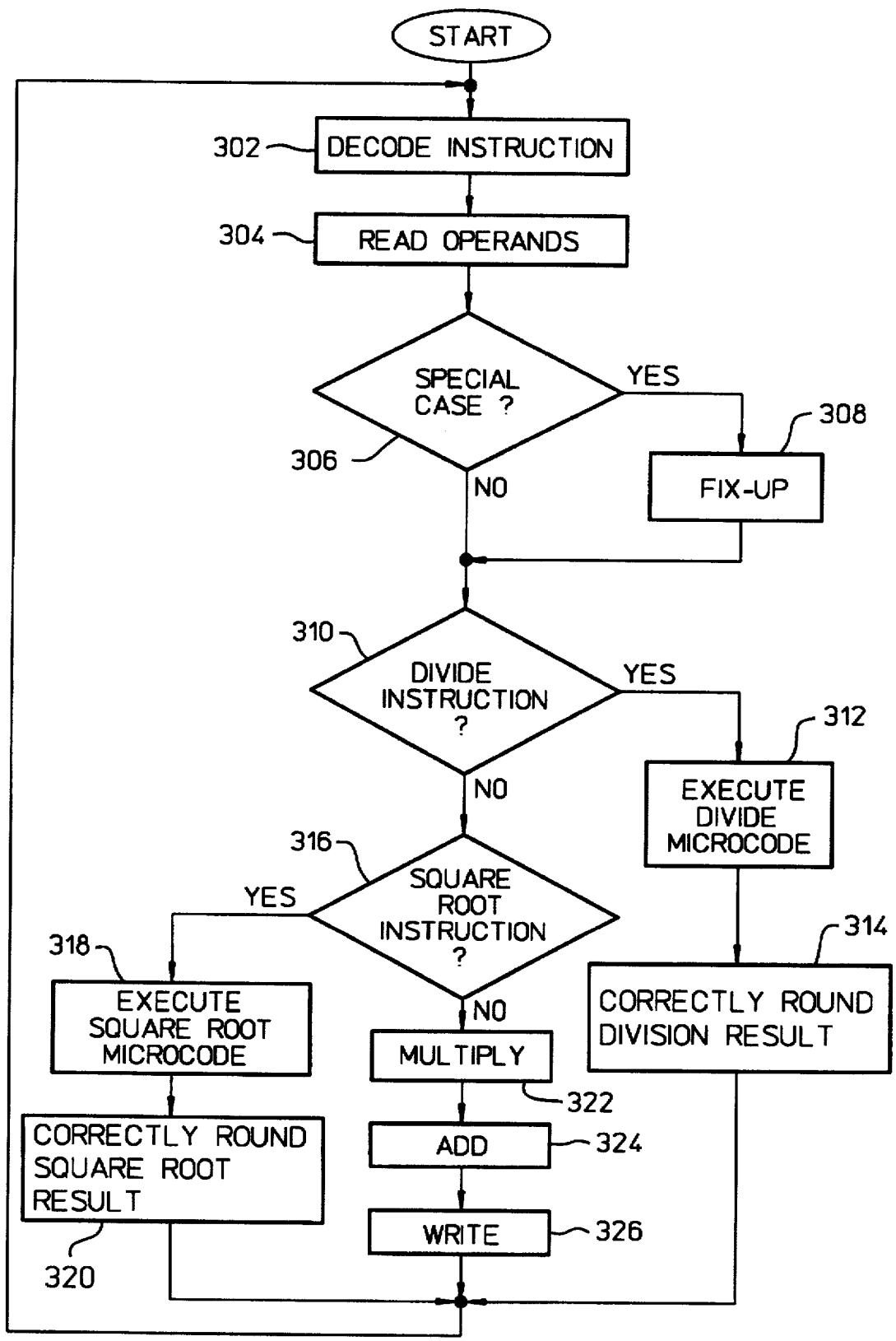
FIG. 3 is a flow chart of the basic operations performed by a control unit.

FIG. 3 is a flow chart of the basic procedures performed or controlled by the control unit 130, 222. When the control unit 130, 222 receives an instruction, various operations occur in a floating point arithmetic unit 100, 200. Initially, the instruction is decoded 302 and its operands are read 304. Next, a decision 306 is made based on whether or not a special case exists. A special case exists when the operands are not normal numbers. If the operands are not normal numbers, the operations are "fixed-up" 308 according to the IEEE standard 754-1985 and then flow control continues as if the numbers were initially normal. For example, if one of the numbers is $0.02 \times 10^{-3}$, then it would be "fixed-up" (in this case normalized) to $0.2 \times 10^{-4}$ before processing continues.

Next, a decision 310 is made based on whether or not the instruction is a divide instruction. If the instruction is a divide instruction, the control unit 130, 222 executes 312 divide microcode. Thereafter, in accordance with the invention, the result of the divide instruction is correctly rounded 314 using the rounding microcode 134, 226.

If the decision 310 determines that the instruction is not a divide instruction, a decision 316 is made based on whether the instruction is a square root instruction. If the instruction is a square root instruction, the control unit 130, 222 executes 318 square root microcode and thereafter correctly rounds 320 the result of the square root instruction using the rounding microcode 134, 226. If, on the other hand, the instruction is determined 316 not to be a square root instruction, then a multiply operation 322 and/or an add operation 324 are carried out in conventional fashion by the multiplication unit 104, 204 and the adder 118, 208 illustrated in FIGS. 1 and 2. Thereafter, a result is written 326 back to the register file 102, 202 for temporary storage. Finally, following blocks 314, 320 and 326, the control flow returns to step 302 for decoding of the next instruction.

The procedures performed or activated by the rounding microcode 134, 226 are discussed in detail below with respect to FIGS. 4 and 6. Generally speaking, the procedures performed or activated by the rounding microcode 134, 226 differ depending on how the numbers are stored in the registers. Most machines have registers with the same number of digits as the storage format of the numbers (non-extended format); others, keep extra bits in the registers (extended format). Since the implementations for the non-extended format and the extended format differ, they are described separately below.

Extended Format Rounding

Some machines (e.g., Intel x87 floating point coprocessor) use an extended format to implement IEEE standard 754-1985. According to the extended format, such machines have registers which keep a few more bits for digits of numbers beyond the memory format.

In this case, the overall object of the invention is to round a floating point result (which has been previously computed) to an exact result when the floating point result contains more bits than desired in the rounded result. The procedures performed or activated by the rounding microcode 134, 226 for a machine using an extended format are described in this section.

Figure 4:
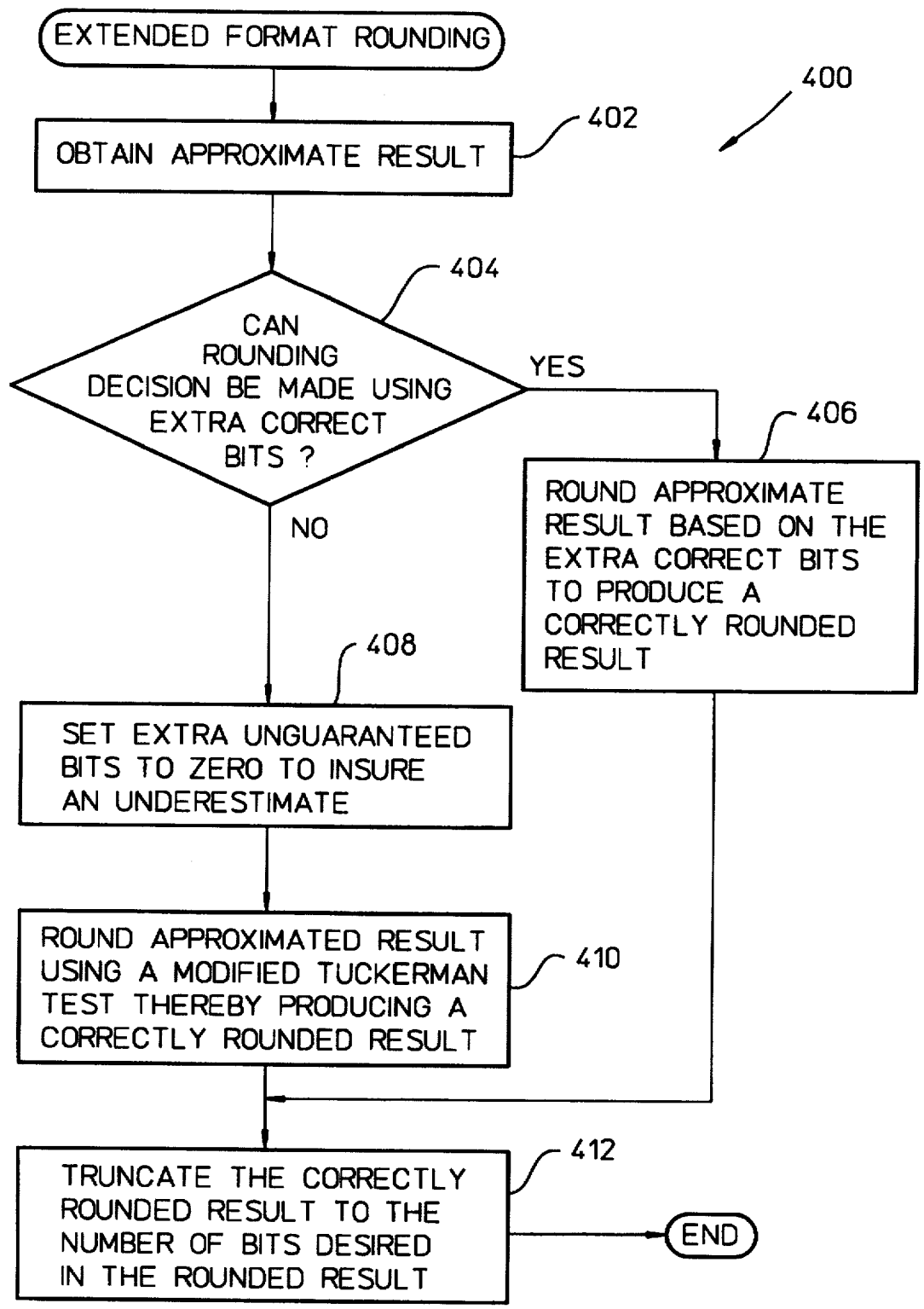
FIG. 4 is a flow chart of the operations carried out by the invention in an extended format embodiment.

FIG. 4 is a flow chart of the basic procedure effectuated by the rounding microcode 134, 226 (and the control unit 130, 222) or other software when performing extended format rounding 400. Appendix A illustrates the basic pseudo-code for high precision division and square root. Initially, an approximated result to be rounded in obtained 402. The approximated result can be the floating point result of a division or square root operation performed by a floating point arithmetic unit. The floating point units illustrated in FIGS. 1 and 2 are merely representative because other approaches and designs are available. How the approximated result is obtained is not important. The format of the approximated result is important and consists of a fixed number of mantissa bits of which most (but not all) are guaranteed to be correct.

For explanatory purposes, it is assumed that the hardware performs base 2 arithmetic with the ability to handle up to double precision in hardware, yet produce a quad precision result. Namely, it is assumed that the mantissa for the hardware (double precision) is 53 bits wide in memory and 64 bits wide in the registers. This is the so called extended format because the registers store more bits than does the memory format. Given this configuration, the unrounded quad result would be 128 bits in the registers. It is further assumed that the hardware (possibly together with divide and square root microcode for divide and square root operations) produces the 128-bit result of which the first 125 bits are guaranteed to be correct. The objective for this exemplary case is to correctly round the result to 113 mantissa bits which is the IEEE format for quad precision numbers. A round-to-nearest mode is also assumed.

Figure 5:
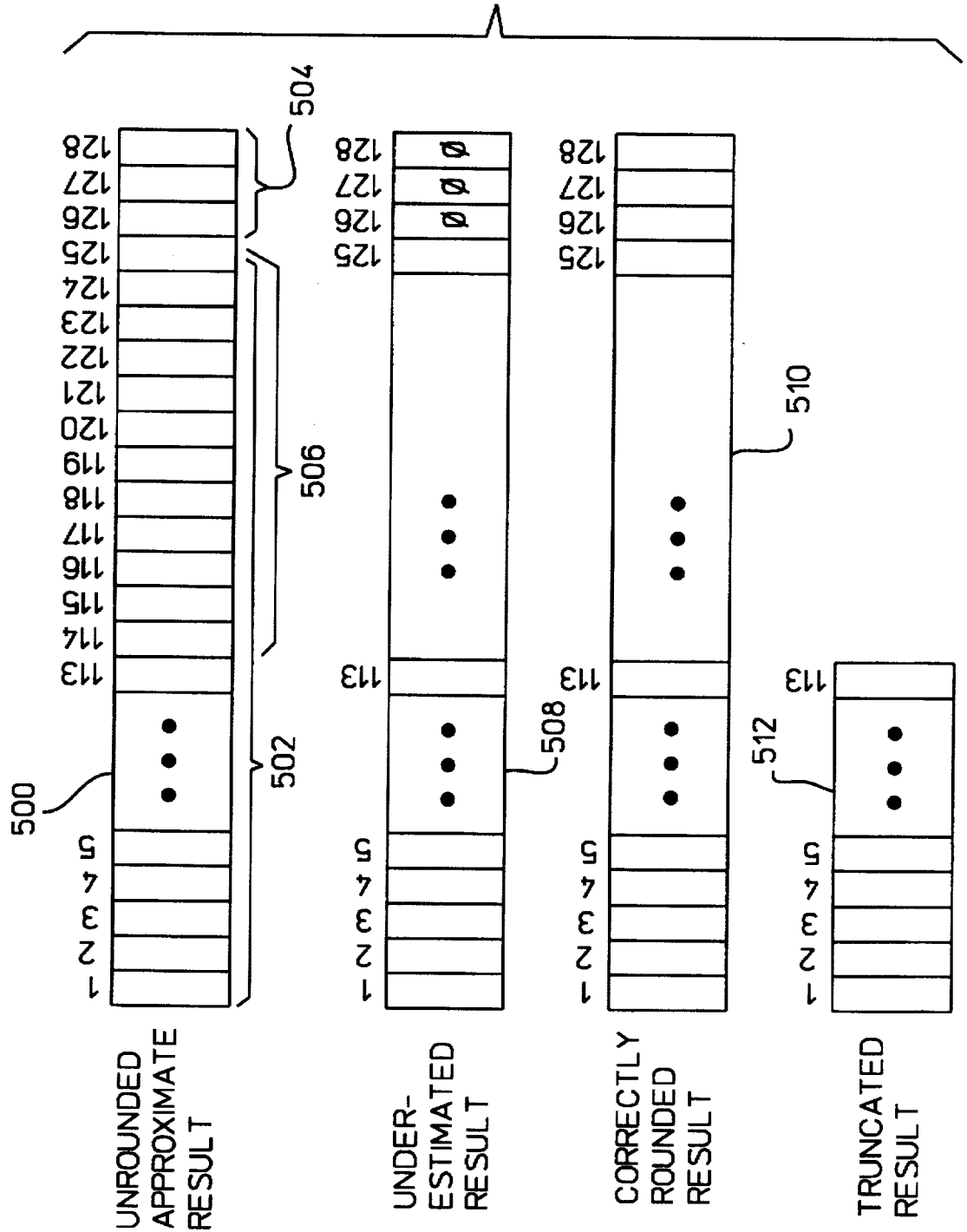
FIG. 5 is a diagram illustrating a truncation operation for an exemplary case of the extended format embodiment.

FIG. 5 is a diagram illustrating the format of an approximate result 500 for the exemplary case. The approximate result 500 has a total of 128 bits of which the first 125 bits 502 are guaranteed to be correct and the last three bits 504 are not guaranteed to be correct. Since in the exemplary case only a 113-bit result is sought, bits 114 through 125 are extra correct bits 506.

Next, a decision 404 is made. This decision 404 is made to determine whether the rounding decision can be made using the extra correct bits which are available. When the decision 404 indicates that the rounding decision can be made using the extra correct bits, the approximate result can be correctly rounded 406 using the extra correct bits to produce a correctly rounded result.

By making use of the extra correct bits to correctly round the truncated approximate result, rounding to the nearest according to the invention will usually require no additional computation. The rounding procedures for the exemplary case are shown in Table I.

TABLE I

| | |
|---|---|
| Round Up (larger value) | if bit 114 is 1 |
| No Round Up (smaller value) | if bit 114 is 0 and one or more of bits 115–125 is 0 |
| Further computation Required | if bit 114 is 0 and bits 115–125 are 1 |

Here, in the exemplary case, bits 114 through 125, inclusive, are extra correct bits 506 which are available (FIG. 5). Statistically, for the exemplary case, the rounding decision will be able to be made using the extra correct bits 504 in all but 1 out of 2,048 numbers. By using the extended format, them is only one 12-bit pattern (i.e., one case in 2,048) which cannot be correctly rounded without computation. Hence, in most cases, the extra correct bits made available by the extended format will be sufficient to make the rounding decision.

When the decision 404 indicates that the rounding decision cannot be made using the extra correct bits, further computation is required. First, the extra unguaranteed bits (504, FIG. 5) are set 408 to zero to insure an underestimated (or equal) result. The underestimated result 508 for the exemplary case is shown in FIG. 5 as having the unguaranteed bits 126 through 128 set to zero. Next, the underestimated result can be correctly rounded 410 using a modified Tuckerman test to produce a correctly rounded result. The modified Tuckerman test operates as does the conventional Tuckerman test for square roots, except that it works for both square root and division and it checks for early termination. As a result, even when the Tuckerman test is needed, the computation time needed to produce a correctly rounded result is, in general, significantly reduced as compared with the conventional Tuckerman test. The modified Tuckerman test is described in detail below.

In any case, regardless of how the correctly rounded result (510, FIG. 5) is obtained, the correctly rounded result is truncated 412 to the number of bits desired in the rounded result. For the exemplary case as illustrated in FIG. 5, the 128 bits of the correctly rounded result 510 are eventually truncated to the 113 bits of the truncated correctly rounded result 512 because the rounded result is to have 113-bits.

It is known that the Tuckerman test can be used for rounding an approximation of a square root. In today's floating point arithmetic units, square root instructions are typically implemented in software using either a power series evaluation or Newton-Raphson iterations. Whichever is used, the last bit must be rounded correctly to the appropriate rounding mode (e.g., IEEE has four rounding modes). Here, the round-to-nearest mode is assumed. There are two known approaches for rounding in the case of square root. One approach is to perform an additional iteration of the Newton-Raphson method (also available for case of division). The other approach is the Tuckerman test which provides the precise criterion for determining whether an approximation of a square root is correctly rounded-to-nearest, or must be changed (up or down one ULP), see Markstein, *Computation of elementary functions on the IBM RISC System/6000 processor*, IBM Journal of Research and Development, Vol. 34, No. 1, January 1990, pp. 111–19. Unfortunately, both known approaches are computationally intensive.

An additional Newton-Raphson iteration is computationally expensive because it would require multiplication of quad numbers which must be performed in software on a double precision machine. A shortcut for the Newton-Raphson technique would be to compute the residual for $(Y_{n+1}+\mu_{113})$ and for $(y_{n+1})$, where $\mu_{113}$ represents the last ULP for the number sought (i.e., here the 113th bit). In general, after iteration k, the residual for division is $(B-Ay_k)$ and the residual for square root is $(A-y_k^2)$. Whichever residual is smaller belongs to the correct result. If the residual for $(y_{n+1}+\mu_{113})$ is smaller, the larger number $(y_{n+1}+\mu_{113})$ is the correct result. If the residual for $(y_{n+1})$ is smaller, the smaller number $(y_{n+1})$ is the correct result. This approach slightly reduces the computation time by eliminating a multiplication and an addition operation which would otherwise be needed to complete the Newton-Raphson iteration and produce the result.

According to the Tuckerman test, if g is a guess to $\sqrt{x}$, then g is correctly rounded-to-nearest if and only if $g(g-\mu)<x<=g(g+\mu)$, where $\mu$ is one ULP. The rounding decision is made based on the sign of the residual for the bit being rounded. The residual for the Tuckerman Test is $(x-g^2)$. In the exemplary case, the rounding decision can be made based on the sign of the residual for $y_{n+1}+\mu_{113}/2$. If the sign of the residual is positive, the larger number $(y_{n+1}+\mu_{113})$ is the desired result. If the sign is negative, the smaller number $(y_{n+1})$ is the desired result. The problem with the conventional Tuckerman test (referred to as the full Tuckerman test) is that it is computationally expensive in terms of processing time. Specifically, doing the full Tuckerman test for higher precisions than supported by the hardware is about as expensive as doing an additional Newton-Raphson iteration.

The invention improves on the full Tuckerman test so that better performance is achieved when rounding results which have a higher precision than supported by the hardware. Basically, the invention modifies the full Tuckerman test to include the ability to make the rounding decision using intermediate results. The test is then referred to as the modified (or enhanced) Tuckerman test.

More particularly, the modified Tuckerman test includes operations which check for early termination conditions. When checking for the presence of early termination conditions, the modified Tuckerman test compares intermediate results with predetermined bound values. Therefore, even in the case where the extra bits available in the extended format cannot make the rounding decision and further computation is needed, the full Tuckerman test can usually be avoided. First, the Tuckerman test can be stopped when the intermediate result becomes negative or zero. In this case, the smaller value is used. Second, the Tuckerman test can also be stopped if the intermediate result is positive and larger in magnitude than a bound on the magnitude of the remaining terms which are all negative. Here, the larger value is used.

It is convenient to check the intermediate results after accumulating all terms larger than $\eta^2$, and after computing all terms larger than $\eta^3$, where $\eta$ represents the precision of numbers in the registers. In the exemplary case, $\eta=2^{-64}$. Hence, when using normalized, IEEE floating point, double precision numbers which have an implicit leading "1", the mantissas lie in the interval between "1" and "2". Therefore, the coefficients of $\eta^2$ and $\eta^3$ are less than "10". The value "10" is obtained by multiplying the number of terms that need to be computed by their maximum value. Computing can stop after the first set of terms unless the residual is positive and less then $10\eta^2$ or after the second set of terms unless the residual is positive and less than $10\eta^3$.

Thus, for randomly distributed residuals, the modified Tuckerman test will terminate after the first test for all but one time out of 16,384 inputs. In the exemplary case, when the modified Tuckerman test terminates early it only performs 9 operations—three of which are double precision multiplications which can be done in hardware.

Figure 8:
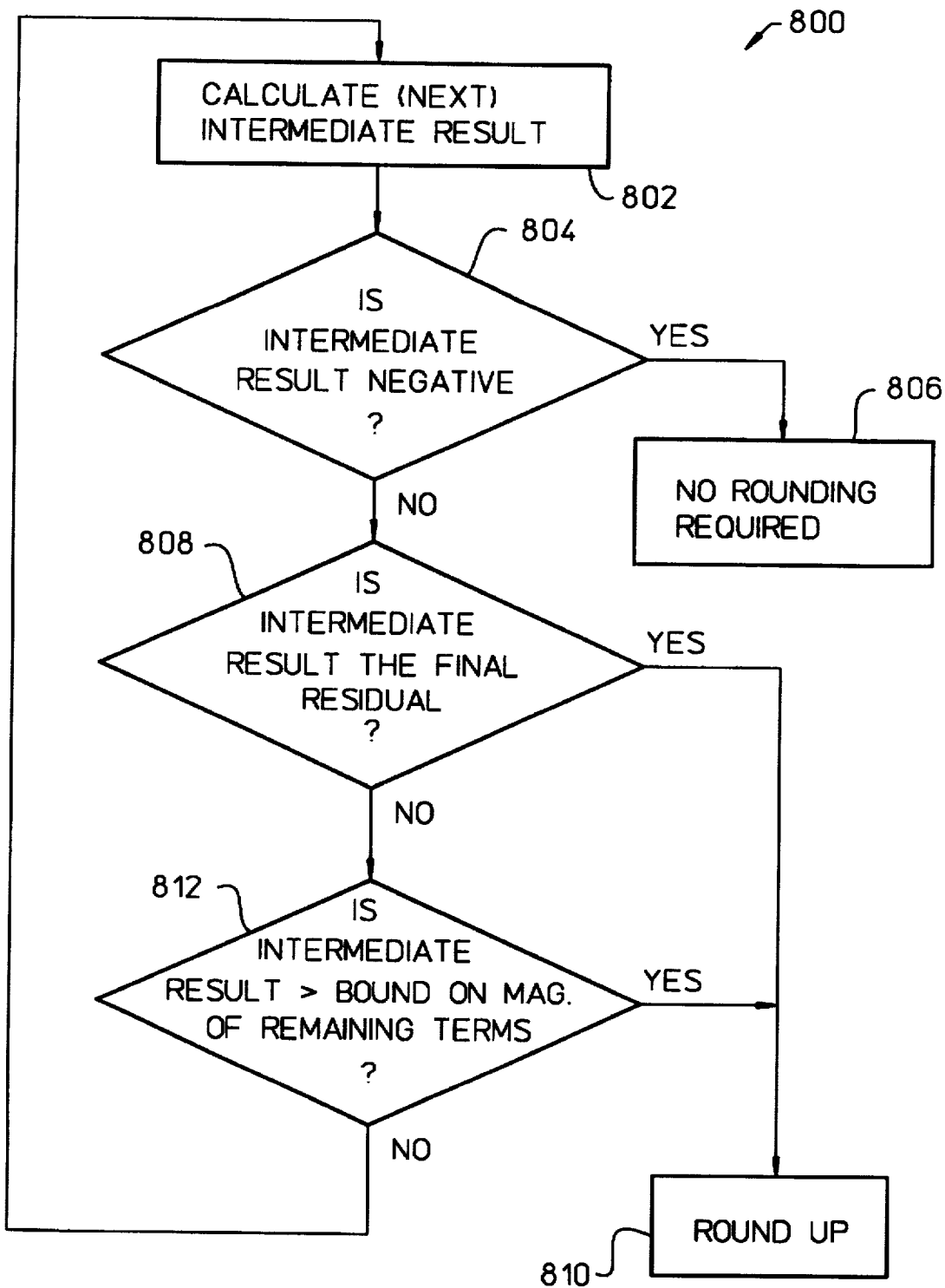
FIG. 8 is a flow chart of an embodiment of the modified Tuckerman test according to the invention.

FIG. 8 is a flow chart of an embodiment of the modified Tuckerman test according to the invention. The modified Tuckerman test 800 begins by calculating 802 an intermediate result of the Tuckerman test. Next, a decision 804 is made based on the sign of the intermediate result. If the sign of the intermediate result is negative, then early termination occurs and the Tuckerman test indicates that the unfounded approximated result is not to be rounded up 806. If, on the other hand, the sign of the intermediate result is positive, then another decision 808 is made. When the intermediate result is the final residual for the Tuckerman test, then the decision 808 causes the Tuckerman test to indicate that the unrounded approximated result is to be rounded up 810.

When the intermediate result is not the final residual for the Tuckerman test, then yet another decision 812 is made. Decision 812 causes early termination to occur if the intermediate result is greater than the bound on the magnitude of the remaining terms. The early termination in this case causes the Tuckerman test to indicate that the unrounded approximated result is to be rounded up 810. If, on the other hand, the intermediate result is not greater than the bound on magnitude of the remaining terms, the eventual residual of the Tuckerman test cannot be predicted to be positive; therefore, the decision 812 causes processing to return to block 802 to begin processing of the next intermediate result of the Tuckerman test.

Appendix B contains an exemplary implementation of the modified Tuckerman test which is useful for division and square root using either extended or non-extended formats. It is helpful, although not necessary, to relate the microcode-type programming in Appendix B to the more general embodiment shown in FIG. 8. The hardware precision $\eta$ is illustrated by n in Appendix B. The intermediate results shown in Appendix B are easily identified by the variable g. The last intermediate result, g[27], is also the final residual for the Tuckerman test. The early termination decision 804 can, for example, be implemented by each of lines 16 and 27. Decision 808 which is the full performed termination is shown by lines 38 and 39. The other early termination decision 812 can, for example, be implemented by each of lines 17 and 28 where $10\eta^2$ and $10\eta^3$ are the respective bounds. Returning of "1" causes the unrounded approximated result to be rounded up (that is a "1" in the bit of the approximated result being tested), whereas returning of "0" causes the unrounded approximated result not to be rounded up (that is a "0" in the bit of the approximated result being tested).

As for multiprecision calculations, rounding according to the novel invention is also not complicated to implement. First, the invention only requires four half precision multiplications and the remaining operations are additions. Second, all the intermediate calculations can be done with a single extra word. The only bad situation is when the lowest order word of the result normalized to be an extension of the next higher order word, has a leading zero followed by all ones. Fortunately, this case occurs only once in $2^{64}$ for random trailing bits. Hence, it is almost never necessary to perform the Tuckerman test (even better than the quad precision case). Even when the Tuckerman test is required, it will usually end early upon checking the intermediate results as described above.

Although the above discussion of the Tuckerman test pertains primarily to rounding square root results, the Tuckerman test can also be adapted for used with division. Conventionally, the Tuckerman test applied only to square root, not division. Recall, the Tuckerman test for rounding was formulated for square root using the following approximation: $(y_{n+1}+\mu_{113}/2)^2=y_{n+1}(y_{n+1}+\mu_{113})$. However, for division there is no similar identity available, but the extra bits in the registers are used to test the sign of: $\{B-A(y_{n+1}+\mu_{113}/2)\}$. With this adaption, the Tuckerman test becomes practical to do in hardware because $\{B-A(y_{n+1}+\mu_{113}/2)\}$ will fit into the registers of the floating point unit.

By making use of the extra correct bits, the approach of the invention is able to avoid doing the Tuckerman test in most cases. In the rare case that the Tuckerman test is necessary, the modified Tuckerman test is used because it substantially improves the speed with which the rounding decision can be made.

Non-extended Format Rounding

In this embodiment, a floating-point number closest to the exact square root or quotient is computed without using any extra bits. For the exemplary case of this embodiment, it is assumed that quad precision numbers are stored as two double precision numbers each having 53 mantissa bits in both memory and the registers. The input is then 106 bits long, and the final rounded result must be correctly rounded to 106 bits.

As an example, the Newton-Raphson method (conventional or modified) described above produces an approximate result with at least 102 correct bits. Standard Tuckerman rounding cannot be used since there may be as many as four bits in error. Although two more iterations of the Newton-Raphson method would yield the correct result, such additional iterations are, as discussed above, too costly in terms of processing time. Instead, according to the invention, Tuckerman rounding is applied six times at different bit positions.

Figure 6:
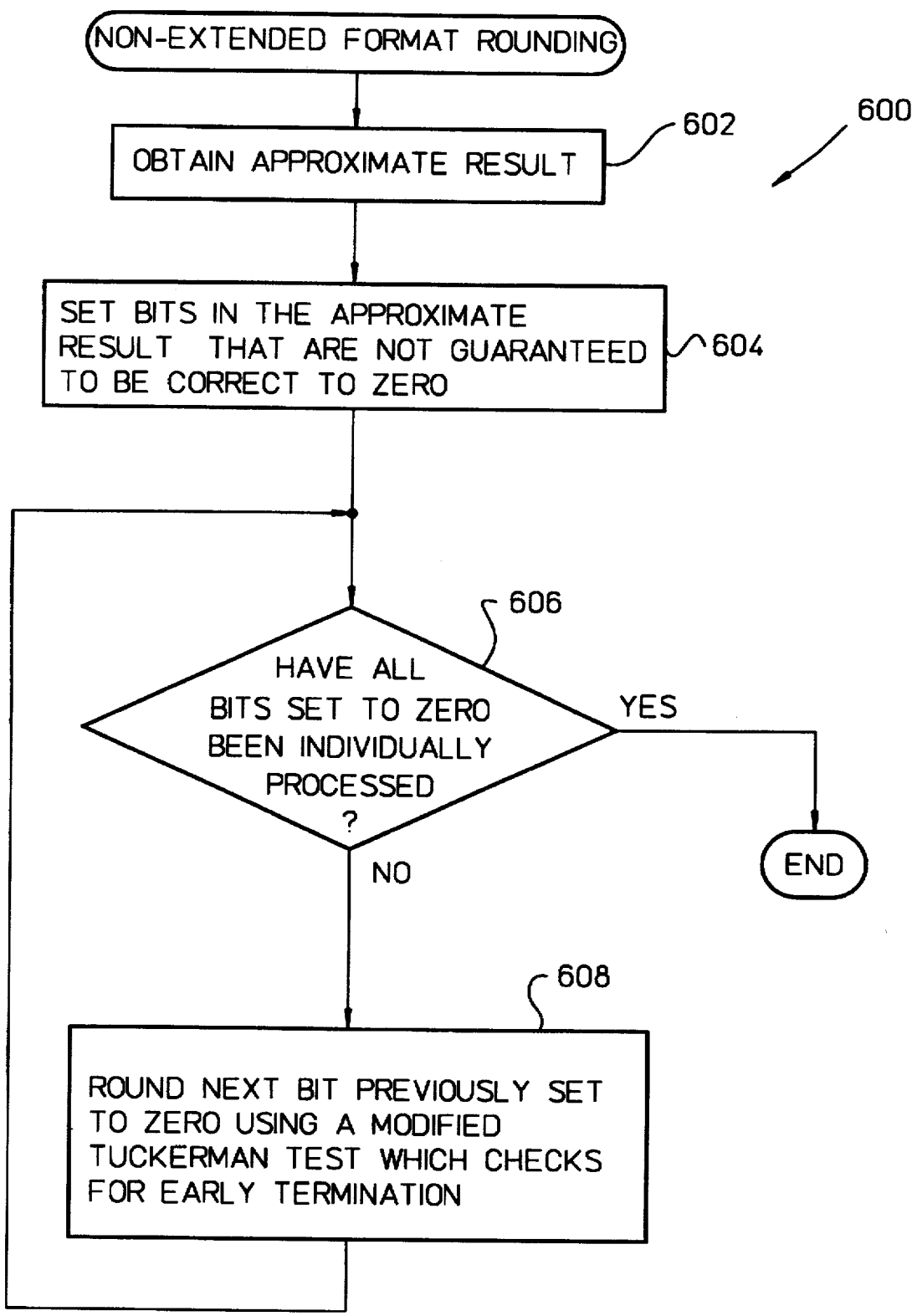
FIG. 6 is a flow chart of the operations carried out by the invention in a non-extended format.

FIG. 6 is a flow chart of the operations carried out by the rounding microcode 134, 226 in a non-extended format. Initially, an approximate result for the divide or square root instruction is obtained 602. Similar to block 402 in FIG. 4, the approximate can be generated in a number of ways, including by the Newton-Raphson method. Here, the approximate result can guarantee that most, but not all, bits are correct. In the exemplary case, the first 102 bits of the 106 bit approximate result are guaranteed to be correct.

Next, the bits in the approximate result that cannot be guaranteed as correct are set 604 to zero. Thereafter, a decision 606 is made. If all the bits that were set to zero have not been individually processed, then the next unprocessed bit of such bits is rounded 608 using the modified Tuckerman test which checks for early termination. The modified Tuckerman test was described both above and in Appendixes A and B in detail. Once all the bits that were set to zero have been individually processed, block 606 causes the rounding operations to stop because the correctly rounded result has been obtained.

Figure 7:
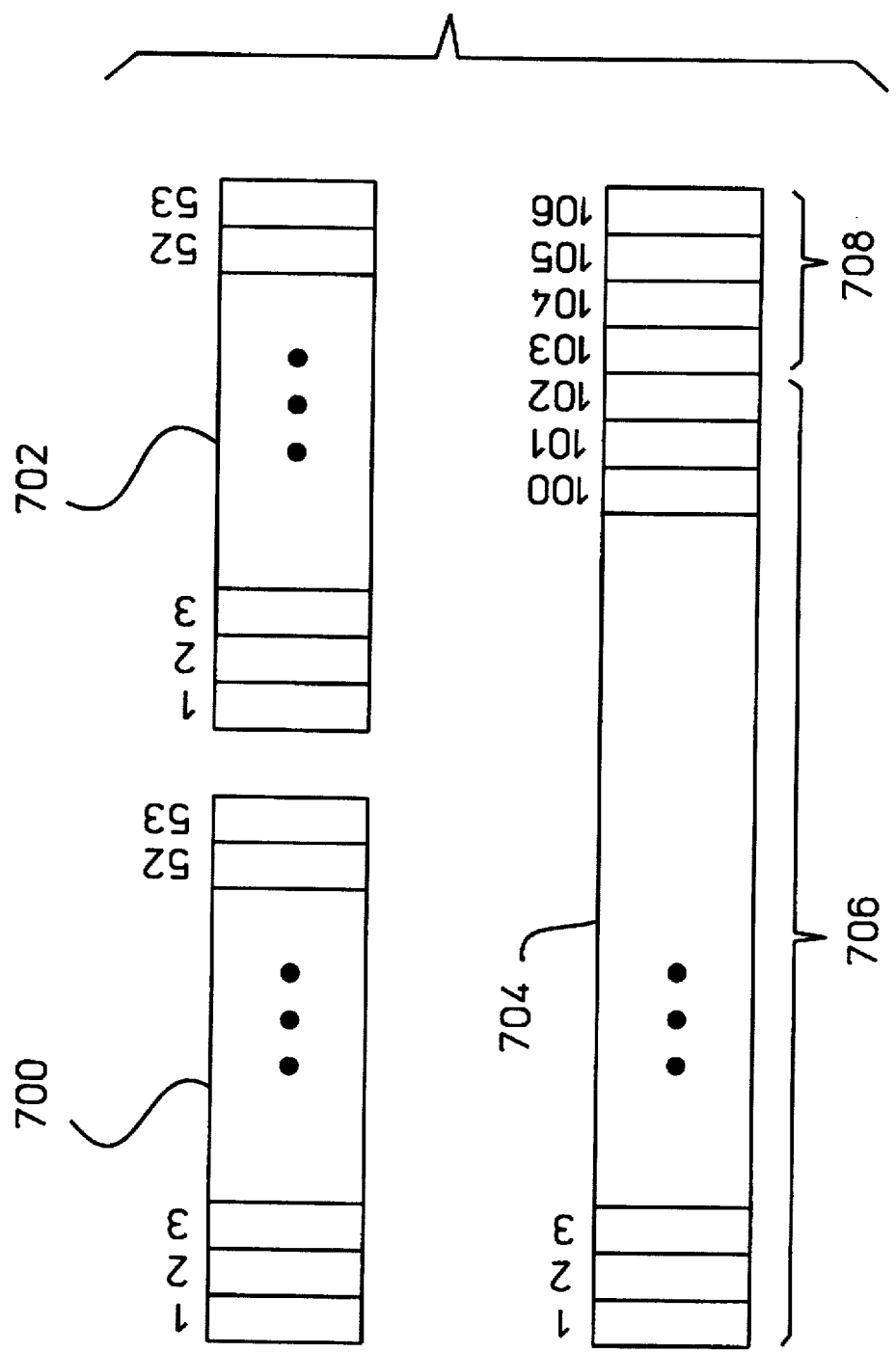
FIG. 7 is a diagram illustrating an approximate result for an exemplary case of the non-extended format.

FIG. 7 illustrates the operations of the non-extended format rounding procedure for the exemplary case. The approximate result obtained 602 is made up of two double precision numbers 700, 702 which have 53-bit mantissas. Together the two double precision numbers 700, 702 form the approximate result 704 which is to be correctly rounded. Here, because the first 102 bits (706) are guaranteed to be correct, the 103'rd, 104'th, 105'th and 106'th bits (708) are set 604 to zero. Since the correct result is underestimated, the correctly rounded 102-bit result is either the 102-bit number or the 102-bit number plus $\mu_{102}$, the ULP of the 102-bit number. The Tuckerman test is then applied the first time. If the Tuckerman test indicates the larger number should be used, the 103'rd bit must be one, so it is set to one by adding $\mu_{103}$. The result remains underestimated, but is correct to 103-bits. The same procedure is repeated for the 103'rd, 104'th and 105'th bits. Thereafter, a final application of the Tuckerman test at the 106'th bit, but here $\mu_{106}$ is added if the test indicates that our results are too small.

Note that the Tuckerman test is repeated in the exemplary case four times. To speed execution, the implementation of the modified Tuckerman test contained in Appendix B is used to minimize the number of operations that must be repeated. Namely, only terms that depend on $V_k$ (which is the point at which the test is being applied) must be recomputed. Hence, best case performance where the first test succeeds, the first application takes 9 operations, and each additional application takes 1 operation, for a total of 13 operations. Worst case performance requires 27 operations for the first application and 9 operations for each additional application, for a total of 63 operations. Typically, the second application of the test is definitive in which case 18 operations are required for the first application and 4 operations for each additional operation, totaling 34 operations. Fortunately, none of the repeated operations is a multiplication, an important consideration for multiprecision arithmetic. Conventionally, to obtain the same precision, two additional Newton iterations are required to compute 215 bits to obtain a correct 106-bit result. The approach of the invention which repeatedly applies the Tuckerman test is clearly faster than the conventional approach.

One, however, must be careful when determining a starting result. For example, if the correctly rounded result ends in the hexadecimal string "8000001", a 2 ULP underestimate beginning value would be 7FFFFFF$_{HEX}$. Following the above procedure, the rounded result would be 8000000$_{HEX}$. This situation is accounted for by testing the initial estimate, 7FFFFF0$_{HEX}$ plus 10$_{HEX}$ using the Tuckerman test. If the Tuckerman test indicates an underestimate, the larger value of 8000000$_{HEX}$ is used as the initial estimate, otherwise the smaller value of 7FFFFF0$_{HEX}$ is used. This additional testing does require one additional iteration of the Tuckerman test.

As in the extended format embodiment, in this embodiment, using the Tuckerman test with division is more difficult. If the approach for this embodiment followed that of the extended format embodiment, then $y_{n+1}+\mu_{106}/2$ would be used but does not fit into the registers of the floating point arithmetic unit. Instead, since the hardware in this embodiment does not support an extended format, the residual for the Tuckerman test is computed from $B-Ay_{n+1}-A\mu_{106}$. Since $y_{n+1}$ is a very good approximation to B/A, the first two terms will nearly cancel leaving a positive value since the exact quotient is underestimated. The term $A\mu_{106}$ is easily computed and stored by the hardware because, barring underflow, the result is a rescaling of A.

General Considerations

The above discussion dealt with a round-to-nearest mode which returns the floating-point result closest to the exact answer. The IEEE floating-point standard ANSI/IEEE 754-1985 includes three other rounding modes: round-to-zero, round-to-positive-infinity, and round-to-negative infinity. Although the invention concerns a round-to-nearest mode, the floating point unit can also be operated so as to optionally utilize these alternative rounding modes but to do so requires the following changes to the above described extended format embodiment and non-extended format embodiment (assuming use of Newton iterations for division and square root).

In the extended format embodiment, the procedure differs as follows:

Round-to-zero: Simply return the output from the Newton iteration.

Round-to-positive-infinity: If the result is positive, add one ULP to the output from the Newton iteration. If the result is negative, simply return the output from the Newton iteration.

Round-to-negative-infinity: If the result is negative, subtract one ULP from the output of the Newton iteration. If the result is positive, simply return the output from the Newton iteration.

In the non-extended format embodiment, the procedure is the same for the first five Tuckerman roundings (which produce a computed value), but thereafter differs as follows:

Round-to-zero: Simply return the computed value.

Round-to-positive-infinity: If the result is negative, subtract one ULP from the computed result. If the result is positive, simply return the computed value.

Round-to-negative-infinity: If the result is positive, add one ULP to the computed value. If the result is negative, simply return the computed value.

These alternative procedures do not always handle exact results correctly because they assume the beginning value is an underestimate of the desired rounded result. Hence, by subtracting one ULP ($\mu_{128}$ or $\mu_{106}$ for the extended and non-extended formats, respectively) before doing the above roundings guarantees an underestimate.

The above discussion assumes that the floating point unit has an instruction that returns the quad precision result of arithmetic operations on two double precision numbers. Namely, the invention assumes that the hardware can provide all the digits in a product of two hardware precision numbers as well as the leading quad (e.g., 2N) precision part of a sum. Some existing computers have hardware instructions that return the quad precision result (i.e., all the digits) of multiplying two double precision numbers, other computers do not have such instructions. Some computers (e.g., IBM S/370) have instructions which return the quad precision part of the sum of two numbers.

Although it is preferable that the hardware support these requirements, if the hardware is unable to support these requirements, then software may be used in conjunction with the hardware to provide the same. An example of code which may be used to augment the hardware to return a quad precision result of the product of two double precision numbers is provided in Table II. More particularly, Table II illustrates the C-language code for returning all the bits of a product of two double precision numbers stored in the single-single format is as follows. In this example, the variables are stored as single precision numbers.

TABLE II

```
void prod (a,b,c)      /* All digits of c = a*b */
    float a[], b[], c[]
{
    double t, u, v, w, x, y;
    u = (double a[0]) * (double b[0]);
    v = (double a[0]) * (double b[1]);
    w = (double a[1]) * (double b[0]);
    x = (double a[1]) * (double b[1]);
    y = v + w + (float x);
    t = u + y;
    c[0] = t;
    t = t - c[0];
    c[1] = t;
    t = t - c[1] + x - (float x);
    c[2] = t;
    c[3] = t - c[2];
}
```

Hence, the result is returned as four single precision numbers $c[0]$, $c[1]$, $c[2]$ and $c[3]$. This approach assumes that the double precision format holds at least two digits more that the product of two single precision numbers, a condition met by IEEE floating point.

A sum can contain a very large number of digits when the exponents substantially differ. The leading quad precision pan (e.g., 2N-bits) of the result is required by the invention. Hence, since the hardware may not support direct retrieval of the leading 2N-bits, an example of C-language code which may be used to return the leading quad precision part of the sum of two double precision numbers is provided in Table III

TABLE III

```
void sum (a,b,c)     /* Leading 2N digits of c=a+b*/
    float a[], b[], c[]
{
    double cl, ch, max, min, t;
    max = (fabs (a[0]) >fabs (b[0]))?a[0]:b[0];
    min = (fabs (a[0]) <=fabs (b[0]))?a[0]:b[0];
    ch = a[0] + b[0];
    t = min - (ch - max);
    cl = a[1] + b[1] + t;
    t = ch + cl;
    cl = cl - (t-ch);
    c[0] = t;
    c[1] = t - c[0];
    c[2] = cl;
    c[3] = cl - c[2];
}
```

In this example, the high and low order parts of the inputs are stored in separate single precision words, the high and low parts are then added with the carry from the low order propagating to the high order. The sum is stored as four single precision numbers $c[0]$, $c[1]$, $c[2]$ and $c[3]$.

Hence, although the invention requires access to all the digits of a product of two hardware precision numbers as well as the leading 2N-bits (e.g., quad) precision part of a sum, the invention does not require any special hardware (beyond multiplier and adder-subtractor units) within the floating point arithmetic unit because software can make up for the deficiencies of the hardware. The use of such software will, however, degrade performance.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

APPENDIX A

This appendix contains a pseudo-code description of microcode executed by the control unit 134, 226 to obtain and correctly round high precision division and square root results.

Extended Format

Procedure to get error to half an ULP or less on a computer with extra bits in the registers.

$R = u(A)$           /* 1 ULP square root */
$F = R + t(A,R,R,u)$ /* 1/2 ULP square root */
$S = d(B,A)$         /* 1 ULP quotient */
$G = S + t(B,A,S,u)$ /* 1/2 ULP quotient */

The functions u(A) and d(B,A) respectively return the square root and quotient with at most four bits in error. Routine t performs the modified Tuckerman test with ULP u. The resulting square root is F and the resulting quotient is G, each result having an error no larger than ½ ULP.

Non-extended Format

Procedure to get error to half an ULP or less on a computer without extra bits in the registers. The procedures assumes an error of up to 15 ULPs.

A. Square Root $R = u(A)$                              /* Square */
$u = 10$
$V = u*(R/u)$                           /* Set trailing bits to zero */
if $(t(A,R,R,2*u) > 0)$ $V = V + u$     /* Borrow? */
while $(u>1)$ {
    $V = V + (u/2)*t(A,V,V,u)$
    $u = u/2$
}
$F = V + t(A,V,V,1)$                    /* Final Rounding */

B. Division $S = d(B,A)$                            /* Division */
$u = 10$
$V = u*(S/u)$                           /* Set trailing bits to zero */
if $(t(B,A,S,2*u) > 0)$ $V = V + u$     /* Borrow? */
while $(u>1)$ {
    $V = V + (u/2)*t(B,A,V,u)$
    $u = u/2$
}
$F = V + t(B,A,V,1)$                    /* Final Rounding */

APPENDIX B

An implementation of the modified Tuckerman Test for division is provided in this Appendix. The implementation defines the modified Tuckerman Test as it would by carried out in microcode. More specifically, the implementation is described as using a C-like programming language for a UNIX desk top calculator bc. The method is implemented using integers because by doing so provides complete control over the number of bits included in the operations. The implementation that follows incorporates a few utility routines used with the UNIX desktop calculator. Namely, the routine h(a,n) returns the first n base obase digits in a, and the routine l(a,n) returns the second n obase digits in a, where obase is the number base used for the output.

Modified Tuckerman Test—Division (b/a)

```
1:   "v(b,a,y,u) - Tuckerman test for b ~ ay at ULP u: "; 0
2:   define v(b,a,y,u){
     /* b is the numerator, a is the denominator, y is the unrounded
     approximate result, and u is the accuracy of y */
3:        auto v
4:        v = u/2
5:        if ( v = = 0 ) v = 1 /*I Last pass rounds */
6:        /* Approximate Tuckerman test with high order parts */
7:        g[1] = h(a,n)*h(y,n)
8:        g[2] = h(a,n)*l(y,n)
9:        g[3] = l(a,n)*h(y,n)
10:       g[4] = h(b,n)-h(g[1],n)
11:       g[5] = h(g[4],n)+l(b,n)
12:       g[6] = l(g[1],n)+h(g[2],n)
13:       g[7] = h(g[6],n)+h(g[3],n)
14:       g[8] = h(g[5],n)-h(g[7],n)
15:       g[9] = h(g[8],n)-h(a,n)*v
16:       if ( g[9] <= 0 ) return ( 0 )
17:       if ( g[9] > 10*n^2 ) return ( 1 )
          /*
          Next set
          */
18:       g[10] = l(a,n)*l(y,n)
19:       g[11] = h(g[10],n)+l(g[2],n)
20:       g[12] = h(g[11],n)+l(g[3],n)
21:       g[13] = h(g[12],n)+l(g[5],n)
22:       g[14] = h(g[13],n)+l(g[6],n)
23:       g[15] = h(g[14],n)+l(g[7],n)
24:       g[16] = h(g[15],n)+l(g[9],n)
25:       g[17] = h(g[9],n)-h(g[16],n)
26:       g[18] = h(g[17],n)-l(a,n)*v
27:       if ( g[18] <= 0 ) return ( 0 )
28:       if ( g[18] > 10*n^3 ) return ( 1 )
          /*
          Next set
          */
29:       g[19] = l(g[10],n)+l(g[11],n)
30:       g[20] = l(g[12],n)+(lg[13],n)
31:       g[21] = l(g[14],n)+l(g[15],n)
32:       g[22] = l(g[16],n)+h(g[19],n)
33:       g[23] = h(g[20],n)+h(g[21],n)
34:       g[24] = h(g[22],n)+h(g[23],n)
35:       g[25] = h(g[18],n)-h(g[24],n)
36:       g[26] = l(g[25],n)+l(g[18],n)
37:       g[27] = h(g[25],n)+h(g[26],n)
38:       if( g[27] <= 0 ) return ( 0 )
39:       return ( 1 )
40:   }
```

Modified Tuckerman Test—Square Root (√a)

The modified Tuckerman test for square root can be implemented the same as the above implementation for division. The only difference being that the format is v(a,y, y,u).

What is claimed is:

1. A floating point arithmetic unit for performing at least one of a division operation to divide a dividend by a divisor to produce a correctly rounded quotient and a square root operation of a value to produce a correctly rounded square root, said arithmetic unit comprising:

a multi-ported storage device for storing data;

arithmetic means for multiplying two numbers to produce a product and for adding two numbers to produce a sum;

approximation means for providing an approximated result for at least one of the divide and square root operations on said value;

rounding microcode containing procedures for correctly rounding the approximated result of at least one of the divide and square root operations using a Tuckerman test; and a control unit for controlling said floating point arithmetic unit;

wherein said rounding microcode correctly rounds the approximated result to produce a correctly rounded result by insuring that the approximated result is underestimated, and by early termination of the Tuckerman test.

2. A floating point arithmetic unit as recited in claim 1, wherein said rounding microcode comprises rounding means for correctly rounding the approximated result to produce the correctly rounded result, said rounding means including means for performing the Tuckerman test to determine how to round the approximated result;

means for checking a sign of an intermediate result of the Tuckerman test; and means for terminating the performing of the Tuckerman test early and correctly rounding the approximated result based on the sign of the intermediate result.

3. A floating point arithmetic unit as recited in claim 2, wherein said rounding microcode further comprises underestimate means for insuring that the approximated result is an underestimate of an actual result corresponding to the correctly rounded result.

4. A floating point arithmetic unit as recited in claim 1, wherein said rounding microcode comprises rounding means for correctly rounding the approximated result to produce the correctly rounded result, said rounding means including means for performing the Tuckerman test to determine how to round the approximated result;

means for comparing a predetermined value with an intermediate result of the Tuckerman test to produce a comparison result; and means for terminating the performing the Tuckerman test early and correctly rounding the approximated result based on the comparison result.

5. A floating point arithmetic unit as recited in claim 4, wherein said rounding microcode further comprises underestimate means for insuring that the approximated result is an underestimate of an actual result corresponding to the correctly rounded result.

6. A method of operating a data processing system to correctly round a high precision approximated result of a division or square root operation using an enhanced Tuckerman test to produce a correctly rounded result, said method being performed in a data processing system having an arithmetic logic unit and comprising:

(a) operating the arithmetic logic unit to produce an approximate result for the division or square root operation;

(b) transferring the approximate result into a storage unit of said data processing system;

(c) operating the arithmetic logic unit to insure that the approximate result is an underestimate of an actual result corresponding to the correctly rounded result by setting to zero any unguaranteed bits in said storage unit; and (d) operating the arithmetic logic unit to perform the enhanced Tuckerman test on said quantity stored in said storage unit to correctly round the approximate result to produce the correctly rounded result.

7. A method as recited in claim 6, wherein said performing (c) of the enhanced Tuckerman test generates intermediate results, and wherein said performing (d) of the enhanced Tuckerman test comprises:
   (d1) checking a sign of at least one of the intermediate results of the enhanced Tuckerman test; and
   (d2) terminating said performing (d) of the enhanced Tuckerman test early and correctly rounding the approximate result based on the sign of at least one of the intermediate results.

8. A method as recited in claim 7, wherein said performing (d) of the enhanced Tuckerman test further comprises:
   (d3) comparing a predetermined value with one of the intermediate results of the enhanced Tuckerman test to produce a comparison result, and
   (d4) terminating said performing (d) of the enhanced Tuckerman test early and correctly rounding the approximate result based on the comparison result.

9. A method as recited in claim 8, wherein the predetermined value is a bound on the magnitude of the remaining terms to be computed by the enhanced Tuckerman test.

10. A method as recited in claim 9, wherein said terminating (d4) occurs early when the intermediate result is positive and greater than the bound on the magnitude of the remaining terms.

11. A method as recited in claim 6, wherein said performing (d) of the enhanced Tuckerman test further comprises:
   (d1) comparing a predetermined value with one of the intermediate results of the enhanced Tuckerman test to produce a comparison result, and
   (d2) terminating said performing (d) of the enhanced Tuckerman test early and correctly rounded the approximate result based on the comparison result.

12. A method as recited in claim 11, wherein the predetermined value is a bound on the magnitude of the remaining terms to be computed by the enhanced Tuckerman test.

13. A method as recited in claim 12, wherein said terminating (d2) occurs early when the intermediate result is positive and greater than the bound on the magnitude of the remaining terms.

14. A method as recited in claim 6, wherein most of the bits of the approximate result can be guaranteed to be correct.

15. A method for operating a data processing system having an arithmetic logic unit to correctly round a high precision approximated result of a division or square root operation using an enhanced Tuckerman test to produce a correctly rounded result, said method being performed in a data processing system and comprising:
   (a) operating the arithmetic logic unit to produce an approximate result for the division or square root operation performed oil a value;
   (b) transferring the approximate result into a storage unit of said data processing system, the approximate result having extra correct digits stored as extra correct bits in said storage unit beyond that required for the correctly rounded result and extra unguaranteed digits stored as extra unguaranteed bits in said storage unit;
   (c) operating the arithmetic logic unit to, if possible correctly round the approximated result stored in said storage unit of said data processing system using the values of the extra correct digits stored in said extra correct bits;
   (d) operating the arithmetic logic unit to, otherwise, setting said extra unguaranteed bits to zero and correctly rounding the approximated result using the enhanced Tuckerman test; and
   (e) operating the arithmetic logic unit to truncate the correctly rounded result to the number of digits desired.

16. A method for operating a data processing system to correctly round a high precision approximated result of a division or square root operation using an enhanced Tuckerman test to produce a correctly rounded result, said method being performed in a data processing system having an arithmetic logic unit and comprising:
   (a) operating the arithmetic logic unit to produce an approximate result for the division or square root operation on a value;
   (b) transferring into a storage unit of said data processing system the approximate result for the division or square root operation;
   (c) setting the digits in the approximated result that are not guaranteed to be correct to zero by setting to zero bits of said storage unit corresponding to said not guaranteed digits;
   (d) successively and individually, correctly rounding each of the digits set to zero using the enhanced Tuckerman test.

17. A method as recited in claim 16, wherein the approximate result has an equal number of digits as does the correctly rounded result.

18. In a floating point arithmetic circuit having an addition unit, a multiplication unit and a control unit, a Tuckerman test is used to correctly round an approximated result of a square root or division operation to produce a correctly rounded result, the improvement comprising modifying the Tuckerman test so as to check for early termination conditions by:
   (1) calculating an intermediate result,
   (2) if said intermediate result is negative indicating that no rounding is required,
   (3) if said intermediate result is either final residual or if said intermediate result is greater than a bound on magnitude of remaining indicating that rounding up is required, otherwise returning to step (1) to calculate a new intermediate result.

* * * * *